United States Patent [19]

Mahara et al.

[11] 3,910,425
[45] Oct. 7, 1975

[54] AUTOMATIC PLATE PILING APPARATUS

[75] Inventors: Masamichi Mahara, Yokohama; Shoichi Suzuki, Tokyo; Yasuji Yanagida, Yokohama, all of Japan

[73] Assignee: Asahi Glass Co., Ltd., Tokyo, Japan

[22] Filed: Aug. 23, 1974

[21] Appl. No.: 499,922

[52] U.S. Cl. .............. 214/6 DK; 214/6 M; 271/80; 271/84
[51] Int. Cl.² .................. B65H 29/10; B65G 57/03
[58] Field of Search ............... 214/6 DK, 6 M, 6 S; 271/80, 84, 85

[56] References Cited
UNITED STATES PATENTS

| | | | |
|---|---|---|---|
| 1,598,381 | 8/1926 | Makowski | 214/6 DK X |
| 2,573,852 | 11/1951 | Lawrence | 271/85 X |
| 2,890,675 | 6/1959 | Cheever | 271/85 X |
| 3,199,653 | 8/1965 | McGowan | 271/85 X |

*Primary Examiner*—Robert J. Spar
*Assistant Examiner*—Leslie J. Paperner
*Attorney, Agent, or Firm*—Oblon, Fisher, Spivak, McClelland & Maier

[57] ABSTRACT

Automatic plate piling apparatus includes a first conveyor for sequentially conveying the plates, and a driving roller for feeding a conveyed plate to a reciprocable holder. The plate is suspended between the drive roller and the holder until the latter is moved rearwardly a predetermined amount whereby a stopper encounters the plate and removes the same from the holder, the plate being permitted to drop down upon a piling conveyor.

6 Claims, 3 Drawing Figures

AUTOMATIC PLATE PILING APPARATUS

BACKGROUND OF THE INVENTION

1. Field of the Invention

The present invention relates generally to automatic plate piling apparatus and more particularly to an automatic plate piling apparatus wherein the plates which are transferred sequentially are piled up or stacked in preparation for further transfer.

2. Description of the Prior Art:

Heretofore, glass plates transferred sequentially were respectively grasped and stacked at a suitable place, it having heretofore been required to use, in conjunction with such a device for transferring the glass plates, a substantial amount of manual labor.

SUMMARY OF THE INVENTION

Accordingly, it is an object of the present invention to provide an automatic plate piling apparatus for automatically sequentially transferring piled plates and stacking the same in a pile.

Another object of the present invention is to provide an automatic glass plate piling apparatus for sequentially stacking glass plates after a sheet of paper has been inserted between the respective glass plates.

Still another object of the present invention is to provide an automatic glass plate piling apparatus for transferring the piled glass plates to a pallet packaging apparatus.

Yet another object of the present invention is to provide an automatic glass plate piling apparatus for safely placing a glass plate upon the conveyor rollers.

The foregoing objects are acheived according to the present invention through the provision of an automatic plate piling apparatus which includes a series of rollers for sequentially conveying the glass plates, a driving roller or belt for feeding a transferred plate, a reciprocable holder for holding and supporting one edge of the plate fed from the driving roller or belt and transferring the plate while suspended between the driving roller and the holder, and a stopper for stopping the movement of the transferred plate during movement of the holder whereby the plate is removed from the holder and permitted to fall upon a piling conveyor.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
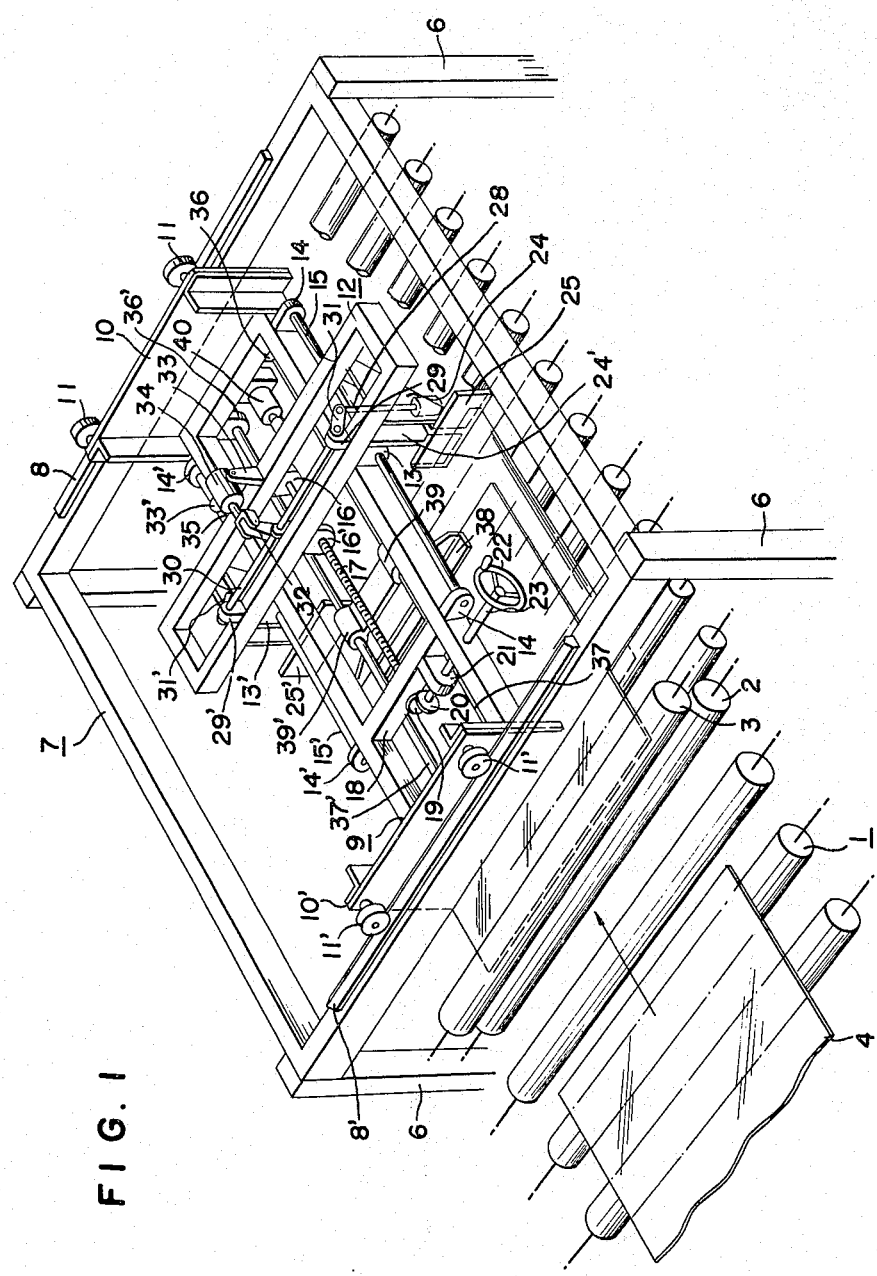
FIG. 1 is a perspective view of an automatic plate piling apparatus constructed according to the present invention and showing its cooperative parts.
Figure 2:
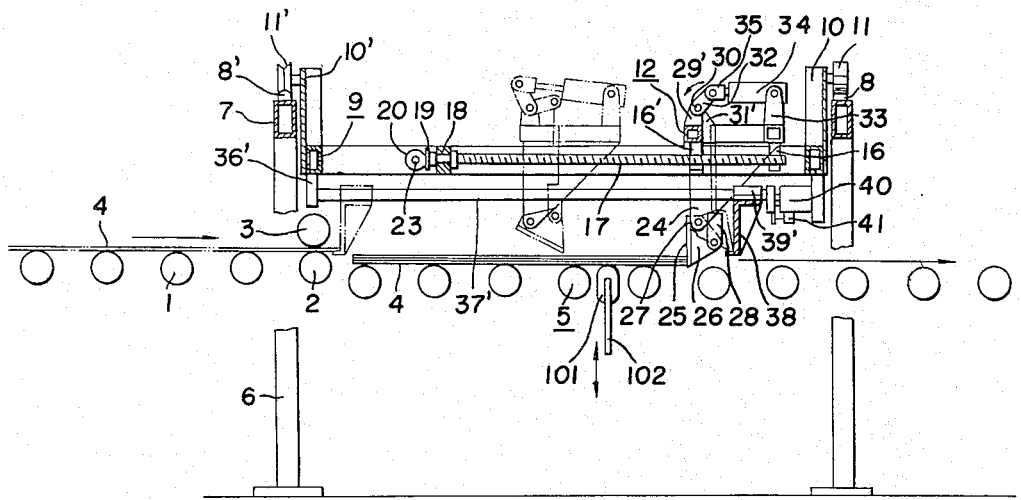
FIG. 2 is a side elevation view, partly in section, of the apparatus of FIG. 1.

Referring now to the drawings and more particularly to FIGS. 1 and 2 thereof, a driving roller 3 is disposed above a final roller 2 of the feeding conveyor 1 and a glass plate 4 upon which a paper is subsequently disposed in alternative fashion with the piled plates, is conveyed upon conveyor 1 so as to pass between rollers 2 and 3 and in turn be conveyed to piling roller conveyor 5, the plane of which is lower than that of the final roller 2 or conveyor 1. A horizontally disposed rectangular yoke 7 is connected to the upper ends of four vertically disposed poles 6 positioned along both sides of the conveyor and is disposed within a plane disposed above the piling roller conveyor 5 and guide rails 8 and 8' are secured upon the upper surfaces of the forward and rearward frame members of the yoke so as to be at right angles to the direction of movement of the glass plates 4. Depending plates 10 and 10' are fixed to another rectangular yoke 9 which may be movably adjusted in the transverse direction with respect to yoke 7 by means of wheels or rollers 11 and 11' also secured to plates 10 and 10' and which are adapted to ride upon guide rails 8 and 8'.

A rectangular stopper yoke 12 is adapted to ride upon the upper surface of adjusting yoke 9 and extends transversely thereto, guide brackets 13 and 13' projecting downwardly from the lower surface thereof. Guide rods 15 and 15' have their ends fixed within other brackets 14 and 14' secured to and projecting from the lateral bars of adjusting yoke 9 whereby rods 15 and 15' extend parallel to the longitudinal axis of yoke 9 whereby the stopper yoke 12 is able to move forwardly and rearwardly therealong. Threaded brackets 16 and 16' also project downwardly from the central bottom surface portion of stopper yoke 12 and an externally threaded shaft 17 is threadedly engaged within bracket 16 at one end thereof and is rotatably disposed within a transverse yoke bar 18 which extends between the longitudinal sides of the adjusting yoke 9 whereby the other end of the screw rod 17 is able to be connected with a bevel gear 19 which in turn is interlocked with another bevel gear 20. The latter is connected to one end of a rotary shaft 23 which is supported within a bracket 21 which is fixed upon yoke bar 18 as well as within one of the sides of yoke 9, a rotary handle 22 being fixed upon the other end of shaft 23 for rotatably moving the same along with bevel gear 20.

Two bases 24 and 24' depend from the bottom surface of stopper yoke 12 and upon both sides of adjusting yoke 9 and a pivoted bracket 26 is interposed between the lower portion of bases by means of pivot pin 27, stopper plates 25 and 25' being integrally formed with brackets 26. One end of a vertically extending working rod 28 is pivoted to the lower end of the pivoted bracket 26 while the other end of working rod 28 is pivoted to arms 31 and 31' which are fixedly connected to the ends of a stopper rod 30 the ends of which are rotatably pivoted within two brackets 29 and 29' mounted upon the upper surface of stopper yoke 12. A working arm 32 is mounted at the center of stopper rod 30 and is pivoted to a piston rod 35 of a hydraulic cylinder 34 which is supported by means of brackets 33 and 33' which are also mounted upon the upper surface of stopper yoke 12.

Slide guide rods 37 and 37' have their ends mounted within brackets 36 and 36' which depend from the lower surfaces of the forward and rearward bars of adjusting yoke 9, and fittings 39 and 39', disposed at the upper ends of substantially L-shaped holders 38, are slidably fitted upon the slide guide rods 37 and 37'. A pusher or actuator 40 is fixedly supported upon the lower surface of the rearward transverse bar of adjusting yoke 9 so as to actuate holder 38 in the direction of or toward the feeding conveyor 1, a limit switch 41 being provided to actuate actuator 40. The holder 38 can be returned in the direction of movement of the feeding conveyor 1 by means of a driven chain or belt and it is possible to drive the holder at the feeding velocity of the glass plate conveyed upon the feeding conveyor 1 when the edge of the glass plate is retained within the L-shaped support surfaces of holder 38.

As the embodiment of the automatic glass plate piling apparatus of the present invention has the structure noted hereinabove, the adjusting yoke 9 is moved through means of wheels 11 and 11' in a transverse manner so as to be positionally aligned with the glass plate 4 being transferred upon the feeding conveyor 1, the adjusting yoke 9 thereafter being fixed by suitable means so as to prevent subsequent movement thereof, and the holder 38 is placed near the rollers 2 and 3 of the roller conveyor 1 as shown by the chain line of FIG. 2. Accordingly, the glass plate 4 being transferred upon the feeding conveyor 1 is further transferred by means of the driving roller 3, and the holder 38 which serves to secure one end of the glass plate 4 is also transferred through means of the slide guide rods 37 and 37' as well as the fittings 39 and 39' as a result of the driving force of the driving roller 3.

When the holder 38 passes through or between and beyond the stoppers 25 and 25', the travel of glass plate 4 is stopped by means of the stoppers 25 and 25', and only the holder 38 is moved still further, the other end of the glass plate 4 having left the driving roller 3 whereby the glass plate 4 is then placed upon the piling roller conveyor 5. Holder 38 subsequently reaches pusher 40 as a result of the initial force of movement of glass plate 4 and when holder 38 makes contact with the limit switch 41 of pusher 40, the latter is actuated so as to return the holder 38 to its original position. The glass plates are thus piled upon piling roller conveyor 5 as a result of a continuous repetition of the aforenoted operation.

When a predetermined number of glass plates 4 are stacked, the hydraulic cylinder 34 is actuated so as to extend piston rod 35 and thereby rotate stopper rod 30 in the counterclockwise direction whereby the arms 31 and 31' will be raised as will stoppers 25 and 25' through means of working rod 28 as shown by the chain lines of FIG. 2, so as to permit the piled glass plates 4 to pass therebeyond as a result of the rotary movement of piling roller conveyor 5.

The position of the stoppers 25 and 25' is adjusted by moving the stopper yoke 12 as a result of rotating the screw shaft 17 through means of handle 22 in the clockwise or counterclockwise direction depending upon the size of the glass plates 4 being transferred, it being readily appreciated that the position at which the ends of the glass plates 4 at which the stoppers 25 and 25' will stop the feeding of the glass plates 4 from the driving roller 3 is thereby adjusted. It is also noted that while in this embodiment, the glass plate is fed by means of the driving roller 3 and the fixed roller 2, it is also possible to use a conveyor belt in lieu thereof.

In accordance with the invention then, one end of each glass plate fed by means of the driving roller or belt, is held by means of the holder 38 which is reciprocally moved rearwardly whereby the glass plate subsequently leaves the holder when the feeding of the glass plate by means of the driving roller or belt is completed, the glass plates being precisely and sequentially stacked at the predetermined position. When the glass plate leaves the holder as a result of the action of the stopper, the glass plate drops down upon the roller conveyor 5. In order to prevent an accidental breakage of the glass plates, it is preferable to support the glass plate 4 by means of a vertically reciprocable carrier 101 which is connected with a rod 102 which is reciprocally moved so as to place the glass plate upon the roller conveyor 5 and carriers 101 can be disposed at two longitudinally spaced positions so as to support both ends of the glass plates. Usually, the carrier 101 is used only in conjunction with the first glass plate, since the subsequent glass plates can be stacked without too much difficulty, even though the glass plates fall or drop down upon the roller conveyor, due to the presence of air cushions.

Although no illustration disclosure is given herein for an automatic apparatus for packing glass plates within a pallet, the operation of packaging the piled glass plates within the pallet can be easily performed by utilizing an apparatus for packing such articles within a pallet which comprises a carrier table, for raising the glass plates, which is disposed beneath the roller conveyor, a transferring yoke which moves horizontally upon the rails disposed above the roller conveyor, a carrier yoke fitted to the transferring yoke so as to be vertically movable, and a pair of holders which are connected to the carrier yoke so as to horizontally move and hold the piled glass plates. The piled glass plates transferred upon the roller conveyor are held by means of holders from both sides and are raised and moved in the horizontal direction and then permitted to fall onto a pallet so as to be at the precise position as a result of the movement of the holders, and then the holders are opened so as to stack the piled glass plates by utilizing the bend of the central portion of the piled glass plates. In accordance with the apparatus for packing the glass plates within a pallet, the piled glass plates can be easily further stacked within the pallet at the precise position since the holders can be easily removed by increasing the distance therebetween after contacting the central bent bottom portion of the glass plates piled upon the pallet.

Figure 3:
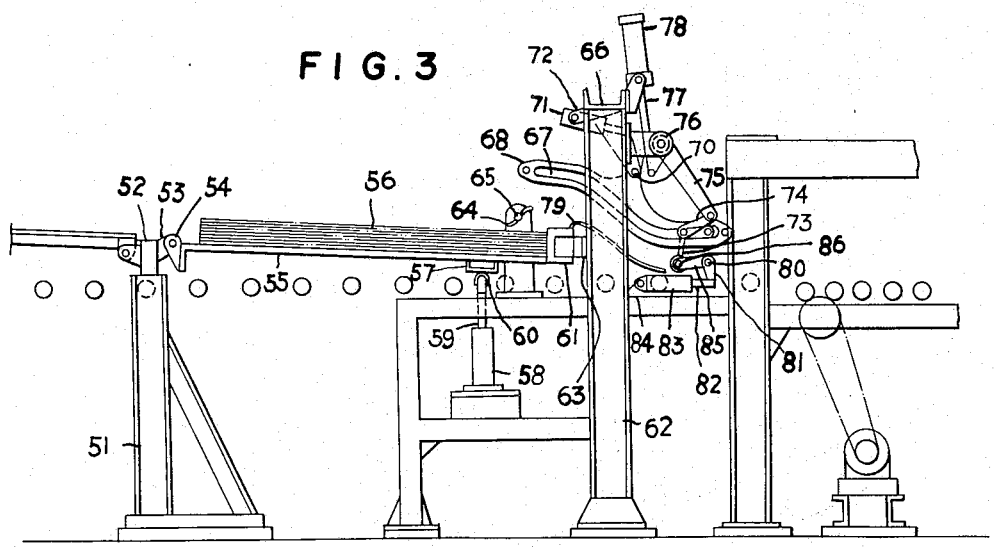
FIG. 3 is a side elevation view of an automatic paper inserting device utilized in conjunction with the apparatus of FIG. 1 for supplying sheets of paper to the plates being transferred by the apparatus of FIG. 1.

Referring now to FIG. 3, there is shown one embodiment of an automatic paper inserting device, wherein cut paper is transferred to a predetermined position by means of a vacuum chuck and is carried upon the glass plate when the latter is passed to the automatic glass plate piling apparatus. A plurality of vacuum chucks for holding the end of the paper are disposed so as to reciprocally transfer the same from a vacuum removal position to a take-off or discharge position through means of guides disposed upon the conveyor apparatus for transferring the glass plates. A pressure roller is also disposed downstream of the forward edge of the paper removed by means of the vacuum chucks whereby the paper is placed upon the glass plate transferred by means of the conveyor.

More particularly, the upper ends of two support poles 51 are connected with a connecting plate 52 and a plurality of brackets 53 project from the connecting plate 52 in the direction of transfer. Arms 54 are secured to a paper table 55 and are pivoted to the brackets 53 by means of a pivot pin, not numbered. A contact plate 57 is secured to the bottom of the paper table 55 and is fitted with a roller 60 which is mounted upon the top of a piston rod 59 of a vertically disposed cylinder 58 whereby the angle or inclination of the paper table 55 may be adjusted by means of cylinder 58 so as to place the top sheet of paper 56 at the predetermined position. A paper carrier 61 is disposed so as to support the side portions of the paper 56 and is fixed to vertically extending poles 62 through means of connectors 63. A plurality of propeller type rubber friction bars 64 are mounted upon a rotary shaft 65 whereby the top sheets of paper 56 are able to be sequentially transferred from the paper carrier 61.

A support plate 66 is secured to the top poles 62 and a guide shaft 70 is rotatably supported by means of dependent arms projecting from support plate 66, guide plates 68 having wave-shaped grooves or slots 67, being in turn supported from shaft 70. The guide plates 68 are pivoted as a result of pivotal movement of the guide shaft 70 under the influence of a guide cylinder 71 which is secured to brackets 72 which project from support plate 66. The ends of a shaft, not numbered, are disposed within the guide grooves 67 of guide plates 68 and a vacuum pipe connected to vacuum chucks 73 are connected thereto through means of additional brackets. The guide rollers disposed within the guide grooves are connected through additional brackets to the guide shaft, and the vacuum chucks 73 are disposed in the vertical direction with respect to the guide grooves 67. Arms 74 are connected at one end thereof to the guide shaft and at the other end thereof to additional arms 75 which are in turn connected to another shaft 76 which is pivoted to additional brackets fixed upon the support poles 62. Shaft 76 is also connected to pivotable brackets connected to a piston rod 77 of a cylinder 78, and a paper support plate 79, which has a configuration similar to that of guide grooves 67 of guide plates 68, is connected to the top portion of paper table 61. A paper stopper shaft 80 is disposed downstream of the rear end of paper support plate 79. The paper stopper shaft 80 is pivoted to the bearings of a plate secured to the paper transfer yoke, one end of an arm 81 being connected to shaft 80 while the other end of arm 81 is pivoted to a piston rod 82 of a cylinder 83 which is pivotally connected to a bracket secured to a connecting plate 84. Roller support arms 85 supporting the pressure rollers 86 are also connected to the paper stopper shaft 80.

The top sheet of paper is thus initially transferred by intermittently rotating the friction bar 64 upon the paper carrier 61 and is transferred further as a result of the pivotal movement of guide plates 68 which is moved under the influence of the guide cylinder 71. One end of the paper 56 is sucked rearwardly by means of the vacuum chucks 73, which are moved by means of the cylinder 78 and when the end of the sheet of paper 56 is transferred beneath the pressure rollers 86, the movement of cylinder 78 is terminated and the vacuum chucks 73 are inactivated so as to release the sheet of paper 56. In this manner, the paper is placed upon a glass plate by means of the pressure rollers 86 and the paper and plate assembly is then able to be fed to the automatic glass plate filing apparatus.

Obviously, many modifications and variations of the present invention are possible in light of the above teachings. It is to be understood therefore that within the scope of the appended claims the invention may be practiced otherwise than as specifically described herein.

What is claimed as new and desired to be secured by Letters Patent of the United States is:

1. An automatic plate piling apparatus comprising:
   a feeding conveyor for sequentially conveying and feeding a plurality of plates;
   a holder normally positioned at a plate receiving station for holding one edge of said plates fed from said feeding conveyor, the other edge of said plates being held by driving rollers of said feeding conveyor;
   said holder being reciprocally movable by said plate to a plate discharge station so as to transfer said plates which are suspended between said holder and said driving rollers of said feeding conveyor during said movement, to a piling conveyor; and
   a stopper for stopping the movement of said plates during continued movement of said holder,
   whereby said plates are released from said holder so as to fall upon said piling conveyor,
   the position at which said stopper is located relative to the movement path of said plates being adjustable so as to accommodate various sized plates.

2. The automatic plate piling apparatus as set forth in claim 1, wherein said plates are glass plates.

3. The automatic plate piling apparatus as set forth in claim 1, wherein said holder is returned to said plate receiving station, after passing said stopper position, in response to actuation by a limit switch means.

4. The automatic plate piling apparatus as set forth in claim 1, wherein the stopper is able to be raised so as to permit said piled plates to pass along said piling conveyor when a predetermined number of said plates are piled.

5. The automatic plate piling apparatus as set forth in claim 1, wherein a carrier is disposed beneath said piling conveyor for carrying and transferring a first plate released from said holder by said stopper, to said piling conveyor.

6. The automatic plate piling apparatus as set forth in claim 1 wherein means are provided for placing a sheet of paper upon said plate at the forward position of said feeding conveyor.

* * * * *